United States Patent [19]
Crick

[11] Patent Number: 6,152,487
[45] Date of Patent: Nov. 28, 2000

[54] PROTECTIVE FENDER COVER

[76] Inventor: Clint Raymond Crick, #101, 9930 - 86 Avenue, Edmonton, Alberta, Canada, T6E 2L7

[21] Appl. No.: 09/106,587

[22] Filed: Jun. 29, 1998

[51] Int. Cl.⁷ .................................................. B60S 3/00
[52] U.S. Cl. ...................... 280/770; 296/95.1; 296/136; 293/112
[58] Field of Search ........................ 280/770; 296/95.1, 296/136; 293/112

[56] References Cited

U.S. PATENT DOCUMENTS

| | | | |
|---|---|---|---|
| 2,880,015 | 3/1959 | Harben | 280/150 |
| 3,298,712 | 1/1967 | Greenstadt | 280/150 |
| 4,531,560 | 7/1985 | Balanky | 150/52 |
| 4,849,272 | 7/1989 | Haney et al. | 428/102 |
| 4,884,824 | 12/1989 | Radke | 280/770 |
| 4,896,911 | 1/1990 | Duke | 293/128 |
| 4,940,276 | 7/1990 | Madison | 296/136 |
| 4,997,229 | 3/1991 | Swanson | 296/136 |
| 5,115,848 | 5/1992 | Malone | 150/166 |
| 5,244,246 | 9/1993 | Cunningham | 296/136 |
| 5,273,316 | 12/1993 | Infante | 280/770 |
| 5,275,460 | 1/1994 | Kraus | 296/136 |
| 5,290,618 | 3/1994 | Olson et al. | 428/100 |
| 5,849,390 | 12/1998 | Dillon | 428/99 |

OTHER PUBLICATIONS

Abstract of U.S. Patent No. 5,195,778, issued Mar. 23, 1993, 1 page.
Abstract of U.S. Patent No. 4,041,999, issued Aug. 16, 1977, 1 page.
Abstract of U.S. Patent No. 3,665,355, issued May 23, 1972, 1 page.
Abstract of U.S. Patent No. 5,144,736, issued Sep. 8, 1992, 1 page.
Abstract of U.S. Patent No. 5,240,305, issued Aug. 31, 1993, 1 page.

*Primary Examiner*—J. J. Swann
*Assistant Examiner*—L. Lum
*Attorney, Agent, or Firm*—Christensen O'Connor Johnson Kindness PLLC

[57] ABSTRACT

A protective fender cover includes a main sheet form body having a top face, a bottom face, and a peripheral edge. Tape fasteners are provided for detachably securing additional sheet form bodies to at least one of the top face, the bottom face and the peripheral edge of the main body. This enables the protective fender cover to be configured as required by the addition of appropriate top layers, bottom layers or lateral extension sheets.

37 Claims, 3 Drawing Sheets

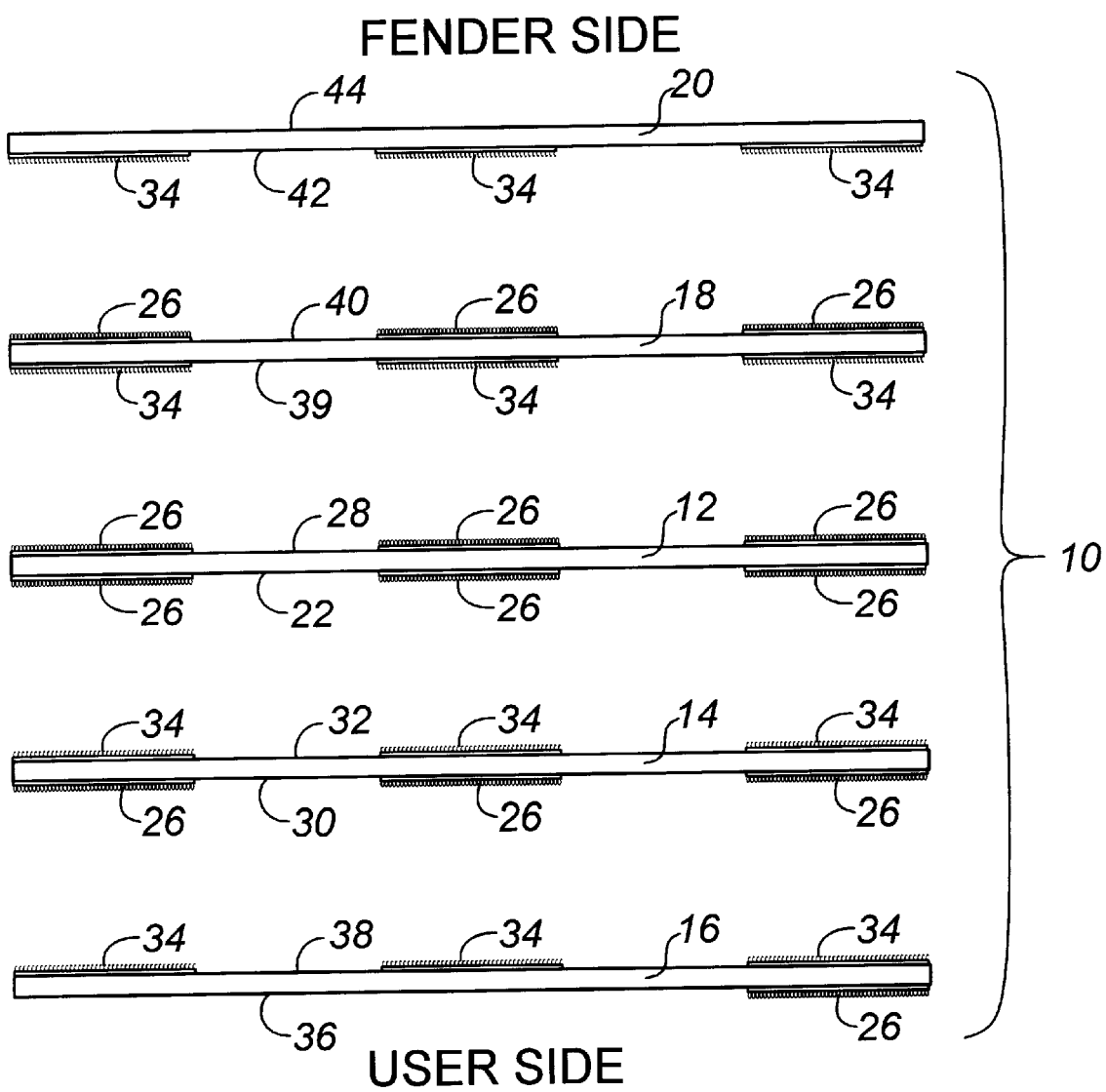

PROTECTIVE FENDER COVER

FIELD OF THE INVENTION

The present invention relates to a protective fender cover for use by automobile mechanics when servicing vehicles and for use on other workpieces.

BACKGROUND OF THE INVENTION

When servicing luxury motor vehicles, mechanics must take great care not to damage the exterior finish of the vehicle. The exterior finish of the vehicle is susceptible to scratching, if the mechanic lays his tools upon the vehicle or rubs the fasteners on his overalls against the finish or while leaning against the automobile inadvertently causes any hard particle in any way to be pressed against or moved along the paint surface. The exterior finish is susceptible to dents if subjected to an impact from a dropped tool or the weight of a heavy object. The exterior finish is susceptible to corrosion if exposed to the chemicals present in brake fluid, carburetor and brake cleaners, and other substances used by the mechanic in the process of servicing a vehicle.

In order to avoid such damage, protective fender covers are commonly used. These fender covers are made from a variety of materials arranged in permanently conjoined layer, and include covers with a cloth top layer with a cloth backing layer, a vinyl top layer with a vinyl backing layer, a vinyl top layer with a rubberized back layer, a vinyl top layer with a cloth backing layer. Some mechanics have discontinued using protective fender covers due to experiences in which the protective fender covers were found to contribute to, rather than prevent, damage. Covers having a cloth top layer with a cloth backing layer have an advantage of being washable. The disadvantages associated with such covers is that they do not stay in position on the fender, liquid contaminants soak through to the fender, they tear easily, they provide negligible impact protection, and if not washed frequently can carry contaminants from one vehicle to another. Covers having a vinyl top layer with a vinyl backing layer provide a number of advantages; they are durable, they can be wiped clean of contaminants between uses, they can provide a greater degree of impact protection, and they do not allow liquid contaminants to soak through. A primary disadvantage associated with such covers is that the vinyl back tends to compress dust or dirt particles against the exterior finish, thereby causing microscratches when shifting of the cover relative to the fender occurs. This is especially pronounced with softer "clearcoat" finishes most commonly found on modern luxury vehicles. Covers having a vinyl top layer with a rubberized back layer have an advantage of improved impact protection. The primary disadvantage associated with such covers is that embedded particles and liquid contaminants tend to remain in the rubberized backing layer as it can't readily be washed or wiped clean. These covers can also leave black marks on the paint and have a relatively short life span. Covers having a vinyl top layer with a cloth backing layer attempt to combine the advantages of each. This has not proven to be successful. The cloth backing layer can not be wiped clean and is difficult to wash properly due to the attached vinyl top layer. Particles embedded in the cloth layer accumulate until the surface approaches a texture similar to that of sandpaper.

SUMMARY OF THE INVENTION

What is required is an alternative configuration of fender cover which addresses the problems described.

According to the present invention there is provided a protective fender cover which includes a main sheet form body having a top face, a bottom face, and a peripheral edge. Means are provided for detachably securing additional sheet form bodies to at least one of the top face, the bottom face and the peripheral edge of the main body.

The protective fender cover, as described above, can be configured to meet the needs of a particular application. It can have an underlying soft layer, for example made of fabric, that is detachable for washing. It can have an overlying top layer that provides for a very low coefficient of friction in relation to cloth overalls or coveralls. If the mechanic is working with brake fluid, additional layers can be added that are resistant to penetration by chemicals. If the mechanic needs to rest any heavy object, such as an air compressor, on the fender temporarily, additional "weight distribution" layers can be added to avoid denting the fender. If problems have been encountered with mechanics dropping tools, impact resistant layers can be added.

Although beneficial results may be obtained through the use of the protective fender cover, as described above, fenders for motor vehicles come in a wide variety of shapes and sizes. Some motor vehicles, such as those sold under the trademark Rolls Royce, have fenders that are close to seven feet in length. Even more beneficial results may, therefore, be obtained when the main body has a peripheral edge, and means are provided for detachably securing co-planar lateral extension sheets along the peripheral edge of the main body. This enables the protective fender cover to be configured horizontally and vertically to cover the fender of the particular make and model of motor vehicle being serviced.

These and other aspects of the invention are described in the detailed description of the invention and claimed in the claims that follow.

BRIEF DESCRIPTION OF THE DRAWINGS

These and other features of the invention will become more apparent from the following description in which reference is made to the appended drawings, wherein:

FIG. 2 is an exploded section view through a protective fender cover with a main sheet form body as illustrated in FIG. 1 forming an intermediate layer.

DETAILED DESCRIPTION OF THE PREFERRED EMBODIMENT

Figure 1:
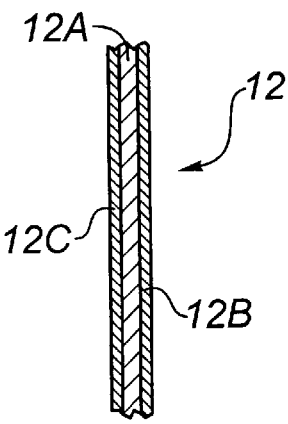
FIG. 1 is a section through a main sheet form body of a protective fender cover constructed in accordance with the teachings of the present invention.

The preferred embodiment, a protective fender cover generally identified by reference numeral 10, will now be described with reference to FIGS. 1 through 6.

Referring to FIG. 2, a protective fender cover 10 is illustrated with an exemplary set of five layers, with a main sheet form body forming a central or intermediate layer 12. The main sheet form body is shown in FIG. 1 and is preferably formed from a cloth or fabric material 12A coated on both sides with a PVC coating 12B, 12C. The main sheet form body should be coated with a material that may be wiped clean on both sides, will not rip or tear under normal usage, is not damaged by chemicals such as solvents, varsols, carburetor cleaners, brake fluids, industrial cleaners and battery acid, will not crack or break in the cold to −40° C., is non abrasive, is non slip in nature against metal surfaces when pressure is applied against and along the work surface to generate friction and is light and pliable.

Figure 3:
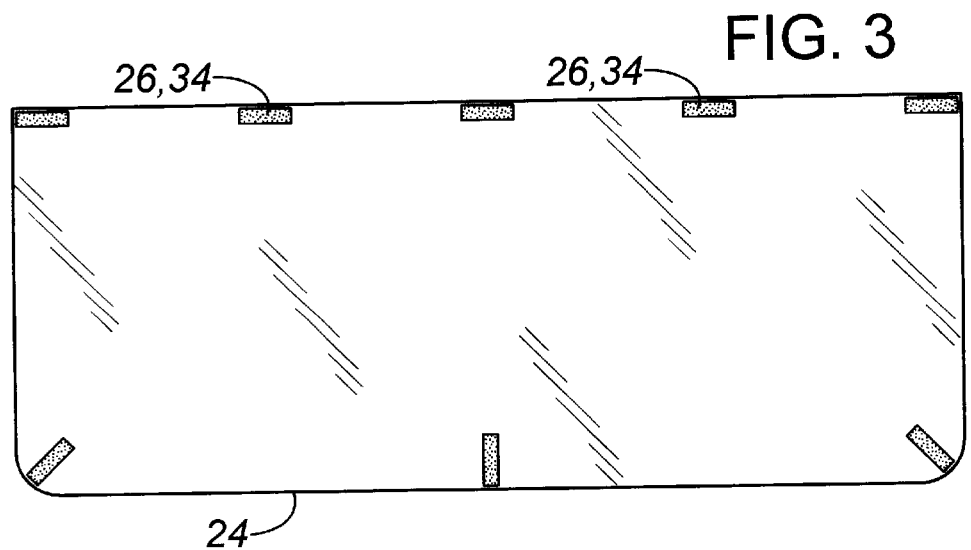
FIG. 3 is a top plan view of the main body of the protective fender cover illustrated in FIG. 2.
Figure 4:
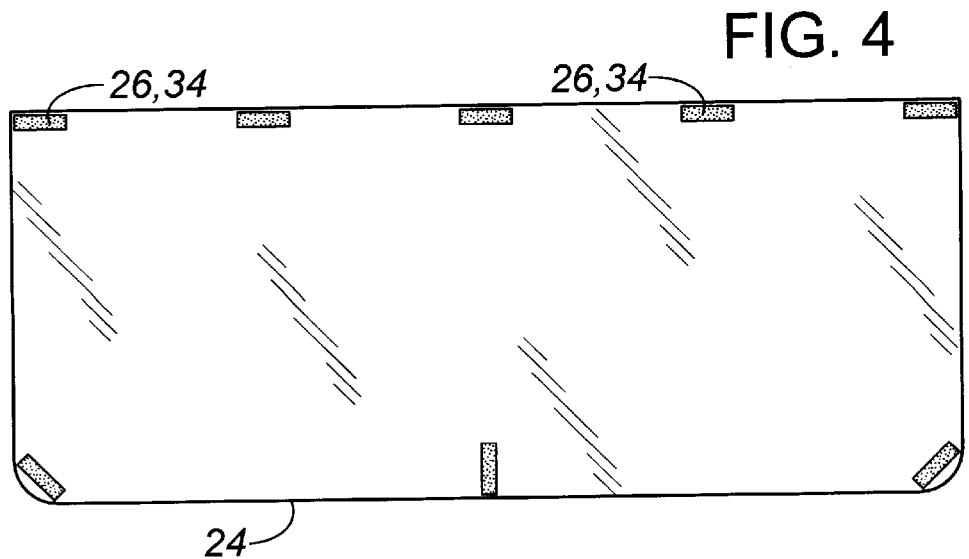
FIG. 4 is a bottom plan view of the main body of the protective fender cover illustrated in FIG. 3.

Referring to FIG. 2, and exemplary protective fender cover 10 includes the main sheet form body 12 to which is attached a number of overlying top layers 14 and 16 as well as a number of underlying bottom layers 18 and 20. Referring to FIGS. 2 and 3, main body 12 has a top face 22. Spaced at intervals along a peripheral edge 24 of top face 22 are a loop portion 26 of a two portion hook and loop mating tape fastener, commonly sold under the trakemark "VELCRO". Referring to FIGS. 2 and 4, main body 12 has a bottom face 28. Spaced at intervals along a peripheral edge 24 of bottom face 28 are the loop portion 26 of the two portion hook and loop mating tape fasteners. FIGS. 3 and 4 are diagrammatic representations of one of the layers. In the case of the main body sheet, all the fasteners are the same (loop fasteners), while on the sheets disposed on either side of the main body sheet, loop fasteners are provided on one side and hook fasteners on the other.

Referring to FIG. 2, in the preferred embodiment illustrated two overlying top layers 14 and 16 are illustrated. Overlying top layer 14 may be an impact resistant and pierce resistant layer, which has a top face 30 and a bottom face 32. Spaced at intervals along a peripheral edge 24 on bottom face 32 of overlying top layer 14 are hook portions 34 of the two portion hook and loop mating tape fasteners. Hook portions 34 on bottom face 32 of overlying top layer 14 mate with loop portions 26 on top face 22 of main body 12 to detachably secure top layer 14 to main body 12. Spaced at intervals along a peripheral edge 24 on top face 30 of overlying top layer 14 are loop portions 26 of the two portion hook and loop mating tape fasteners. Overlying top layer 16 is a vinyl layer having a top face 36 and a bottom face 38. Bottom face 38 of overlying top layer 16 has hook portions 34, which mate with loop portions 26 on top face 30 of overlying top layer 14 to detachably secure overlying top layer 16 to overlying top layer 14. Top face 36 of overlying top layer 16 provides a smooth slip surface which is resistant to chemical spills. The top face 36, or the top face of any layer that forms the uppermost or user side of the protective fender cover, is preferably sufficiently slippery, that is, have a sufficiently low coefficient of friction, that it will bind to a mechanics clothing so as to tend to be caught in the clothing. This is what is meant by slippery in the claims. It will be appreciated that through the material is slippery to a cloth, it may be non-slip to a smooth surface, such as the finish of a vehicle. This combination of slip in relation to cloth and non-slip in relation to a smooth surface is preferred.

Referring to FIG. 2, in the preferred embodiment illustrated two underlying bottom layers 18 and 20 are illustrated. Underlying bottom layer 18 is an impact resistant and pierce resistant layer, which has a top face 39 and a bottom face 40. Spaced at intervals along a peripheral edge 24 on top face 39 of underlying bottom layer 18 are hook portions 34 of the two portion hook and loop mating tape fasteners. Hook portions 34 on top face 39 of underlying bottom layer 18 mate with loop portions 26 on bottom face 28 of main body 12 to detachably secured to underlying bottom layer 18 to main body 12. Spaced at intervals along a peripheral edge 24 on bottom face 40 of underlying bottom layer 18 are loop portions 26 of the two portion hook and loop mating tape fasteners. Underlying bottom layer 20 is a cloth layer having a top face 42 and a bottom face 44. Top face 42 of underlying bottom layer 20 has hook portions 34, which mate with loop portions 26 on bottom face 40 of underlying bottom layer 18 to detachably secure underlying bottom layer 20 to underlying bottom layer 18. Bottom face 44 of underlying bottom layer 20 provides a non-abrasive surface which rests against an exterior finish of a vehicle (not shown).

Figure 5:
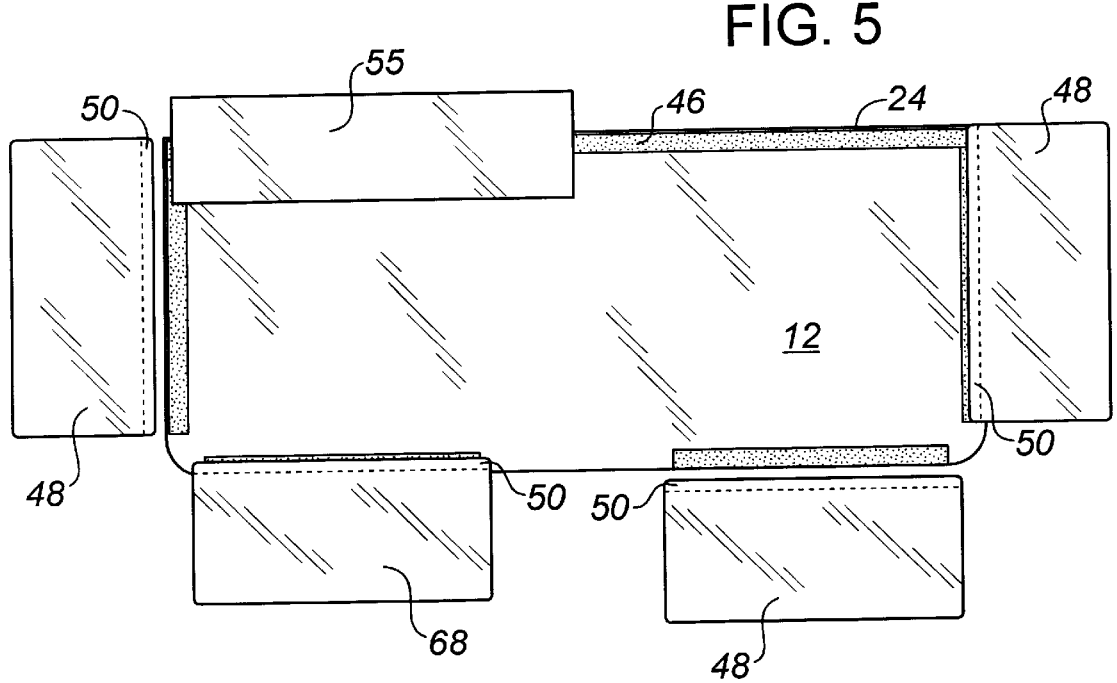
FIG. 5 is a bottom plan view of the main body of a first alternate embodiment of the protective fender cover illustrated in FIG. 2, with co-planar lateral extension sheets attached.

Referring to FIG. 5, an alternative embodiment of main body 12 is illustrated which has an elongated tape fastener band 46 on top face 22 along peripheral edge 24. Tape fastener band 46 serves as a means for detachably securing co-planar lateral extension sheet 48, as required, to expand the surface area of protective fender cover 10. Each of extension sheets 48 has a mating tape fastener band 50 (shown in dotted lines) which mates with tape fastener band 46 on main body along the peripheral edge of the main body.

The use and operation of protective fender cover 10 will now be described with reference to FIGS. 1 through 6. The advantage of the protective fender cover 10 is that is can be configured to suit the requirements of a particular application. For example, if a mechanic is working on the brake system for a luxury Mercedes (trademark) motor vehicle, of paramount concern is corrosive damage caused by brake fluid or scratches caused by the mechanic leaning against the car. In such situations, the mechanic could configure protective fender cover 10 as illustrated in FIG. 2 but without the intermediate layers 14 and 18. In this last mentioned application impact resistant layers 14 and 18 are unnecessary and, accordingly, are not present.

If a mechanic is required to move the air conditioning compressor of a vehicle to gain access to another component and does not want to disconnect its hoses and discharge the system, then it is most convenient to place the air compressor onto the fender, provided that appropriate precautions are taken. In such a situation, the mechanic would configure protective fender cover 10 in the preferred configuration illustrated in FIG. 2. For maximum protection especially on vehicles with thin fenders the mechanic could also add dent shield 55, FIG. 5, to rest the compressor on.

If a mechanic is working on a Rolls Royce™ vehicle, due to the height and length of the fender, the mechanic would add extension sheets 48, as illustrated in FIG. 5 to ensure that there was adequate coverage of the fender.

Figure 6:
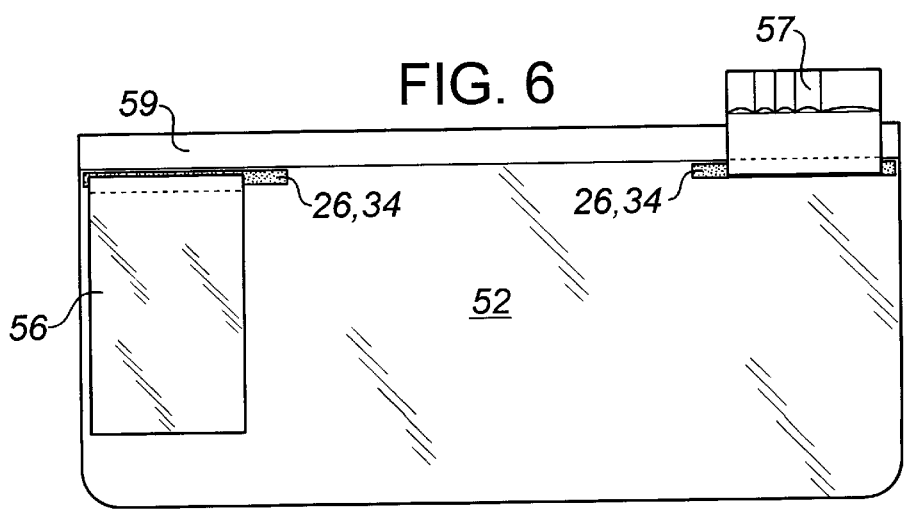
FIG. 6 is a plan view of a main sheet form body according to the invention showing a towel and tool holder attached to the main sheet form body.

Each layer described herein may be a laminate formed of several layers. For example, the main sheet form body may be a coated cloth or synthetic fabric. The laminate may be permanently bonded across all of the material or may be secured along the edges. The soft fender side layer 20 may be for example a synthetic sheepskin material. The sheets 48 may extend from any side of the main sheet form body. A dent resistant shield 55 made for example of plastic may also be detachably attached to the main sheet form body 12. The VELCRO (™) tabs may also be used to detachably secure a towel or tool holder, FIG. 6 shows an embodiment with a towel 56 and tool holder 57 detachably attached to a sheet 52, which may be any of the sheets 14–20. It is preferred that the uppermost surface layer of the layers forming the protective fender cover be sufficiently slippery that they will not bind to a mechanic's clothing. For the bottom layer against a fender it is preferred that the layer be thickened, as for example by folding a soft sheet over along one edge, in areas where shock protection is most required.

Soft or non-abrasive in the context of this patent application means that the material is not damaging to a painted surface of a vehicle under normal working conditions. Launderable means washable such that the material can be washed sufficiently for re-use without being damaged. The main sheet form body 12 or one of the other sheet form bodies may include a magnetic strip 59 (FIG. 6) attached permanently or detachably along one side edge of the main sheet form body as described in Canadian patent application no. 2,178,872 published Dec. 13, 1997. The magnetic strip may be used to secure the protective fender cover to a vehicle. Other elements for fixing the position of the main sheet form body, or any of the layers on the workpiece may be used such as flexible cords, rigid hooks, eyes or slits in a piece of webbing or sheet. The position fixing elements are useful for preventing any movement of the surface in contact with the fender or workpiece from moving relative to the workpiece. Prevention of movement assists in the prevention of a scratch. The position fixing elements are preferably made readily detachable, so that they may be easily removed when not wanted. For example, magnets may be placed in sleeves. Magnets should preferably not be placed on the body 12 in such a way that they may attract iron fillings or other metal fragments which could, if pressed into the surface of a workpiece, visibly damage the surface of the workpiece. Other magnetic pieces held for example in pockets sewed in or onto the main sheet form body may also be used to secure the cover to a workpiece. The protective fender cover may also be used to protect other parts of vehicles or other workpieces that require protection while they are being worked on. The fasteners are preferably located at the edge of the sheets 12–20, and are preferably space at regular intervals along longer edges, and are located of the corners, but also may extend along any of the edges of the sheets. The fasteners may be located inside the edges, but this is not preferred. The fasteners (for fastening sheets to each other) may for example be magnetic sheaths, flexible cords, rigid hooks or eyes or slits in a piece of webbing or sheet. The material forming the slippery surface of any of the sheets may be a coating or may constitute the entire sheet body, or may be separate layer adhered or secured to the sheet.

Dent and pierce resistant material may be metallic sheets, plastic sheets, thick layers of dense foam, with suitable fasteners (eg Velcro™ fasteners) as described. Impact resistant material includes layered synthetic and natural fabrics, and foamed polymers including dense foams. Chemically resistant materials include PVC and other plastic polymers. The sheets described are preferably approximately rectangular as shown but may also be other shapes. Fabric includes material that has a knitted or woven texture and may be made of synthetic, such as plastic polymers, or natural materials such as cotton or wool, While it is possible to use the main sheet form body 12 on its own, it is preferred to use it at least in combination with one other layer, for example layer 20, which helps to protect the vehicle surface. Even when used on its own, the main sheet form body 12 will still have the fastener members at least on one side of it. When the bottom face of the main sheet form body is made to be slippery to cloth or other fabric, a bottom layer is preferably detachably secured to the main sheet form body, with the bottom layer providing a surface against which the slippery bottom face of the main sheet form body may slide. This may be accomplished by forming the bottom layer of fabric.

It will be appreciated by one skilled in the art, that once the teachings of the present invention are understood alternative layers can be provided to address particular needs. It will also be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A protective fender cover, comprising:
    a main sheet form body having a top face, a bottom face, and a peripheral edge;
    means for detachably securing additional sheet form bodies to at least one of the top face, the bottom face and the peripheral edge of the main body; and
    at least one detachably secured non-abrasive sheet form bottom layer underlying the bottom face, the detachable non-abrasive sheet being cleanable by laundering.

2. The protective fender cover as defined in claim 1, wherein there is at least one detachably secured sheet form overlying top layer overlying the top face.

3. The protective fender cover as defined in claim 2, wherein there is a single overlying top layer having a slippery upper surface in relation to fabric.

4. The protective fender cover as defined in claim 2, wherein a chemical shielding uppermost top layer is provided that prevents any substance from penetrating to a layer beneath.

5. The protective fender cover as defined in claim 1, wherein there is a single underlying bottom layer.

6. The protective fender cover as defined in claim 5, wherein the single underlying bottom layer is a launderable non-abrasive material.

7. The protective fender cover as defined in claim 1, wherein the launderable non-abrasive material is a fabric.

8. The protective fender cover as defined in claim 1, wherein the mains for detachably securing the additional sheet form bodies to the main body includes mating tape fasteners.

9. The protective fender cover as defined in claim 1, wherein at least one co-planar lateral extension sheet is detachably secured to the main body.

10. The protective fender cover of claim 1 in which the main sheet form body is detachably secured to an additional sheet, and a lateral extension sheet is detachably secured to the additional sheet.

11. The protective fender cover of claim 1 in which the main sheet form body has a slippery top face in relation to fabric.

12. The protective fender cover of claim 11 in which the main sheet form body has a slippery bottom face in relation to fabric.

13. The protective fender cover of claim 12 further comprising a bottom layer detachably secured to the main sheet form body, the bottom layer providing a surface against which the slippery bottom face of the main sheet form body may slide.

14. The protective fender cover of claim 1 further comprising at least one additional layer detachably secured to the main sheet form body and at least one lateral extension sheet extends from the additional layer.

15. The protective fender cover of claim 1 in which at least one position fixing anchoring elements is detachably secured to the main sheet form body.

16. A protective fender cover, comprising:
    a main sheet form body having a top face, a bottom face, and a peripheral edge;
    means for detachably securing additional sheet form bodies to at least one of the top face, the bottom face and the peripheral edge of the main body; and at least one detachably secured dent and pierce resistant sheet form top layer overlying the top face.

17. A protective fender cover, comprising:
a main sheet form body having a top face, a bottom face, and a peripheral edge;
means for detachably securing additional sheet form bodies to at least one of the top face, the bottom face and the peripheral edge of the main body; and several overlying top layers having differing properties and means to detachably secure the top layers together so that one of the several top layers overlies another of the several top layers.

18. The protective fender cover as defined in claim 17, wherein at least one of the overlying top layers is vinyl.

19. The protective fender cover as defined in claim 17, wherein the several overlying top layers include an impact resistant and pierce resistant layer detachably secured to the top face of the main body and a vinyl layer detachably secured to the impact resistant and pierce resistant layer.

20. The protective fender cover as defined in claim 17, wherein an uppermost of the several top layers has a slippery surface in relation to fabric.

21. A protective fender cover, comprising:
a main sheet form body having a top face, a bottom face, and a peripheral edge;
means for detachably securing additional sheet form bodies to at least one of the top face, the bottom face and the peripheral edge of the main body; and several underlying bottom layers having differing properties and means to detachably secure the bottom layers together so that one of the several bottom layers underlies another of the several bottom layers.

22. The protective fender cover as defined in claim 21 wherein the several underlying bottom layers include an impact resistant and pierce resistant layer detachably secured to the bottom face of the main body and a non-abrasive layer detachably secured to the impact resistant and pierce resistant layer.

23. The protective fender cover as defined in claim 21, wherein a lowermost of the several bottom layers is made of a launderable, non-abrasive material.

24. A protective fender cover, comprising:
a main sheet form body having a top face, a bottom face, and a peripheral edge; and
means for detachably securing additional sheet form bodies to the top face, the bottom face and the peripheral edge of the main body.

25. The protective fender cover as defined in claim 24, wherein there is at least one overlying top layer and at least one underlying bottom layer detachably secured to the main body.

26. The protective fender cover as defined in claim 24, wherein at least one co-planar lateral extension sheet is detachably secured along the peripheral edge of the main body.

27. The protective fender cover as defined in claim 24, wherein one of an overlying top layer and an underlying bottom layer is detachably secured to the main body, and at least one co-planar lateral extension sheet is detachably secured along the peripheral edge of the main body.

28. The protective fender cover as defined in claim 24, wherein one of an overlying top layer and an underlying bottom layer is detachably secured to the main body.

29. The protective fender cover as defined in claim 24, wherein there several overlying top layers and means to detachably secure the top layers together along with several underlying bottom layers and means to detachably secure the bottom layers together.

30. The protective fender cover as defined in claim 29, wherein at least one of the layers is an impact, pierce and pressure resistant shielding layer.

31. The protective fender cover as defined in claim 24, wherein the means for detachably securing the additional sheet form bodies to the main body includes mating tape fasteners.

32. A protective workpiece cover, comprising:
a plurality of detachable layers comprising at least a workpiece side layer having a workpiece side surface formed of a soft sheet material, a top layer and an intermediate layer of sheet material detachably secured between the top layer and the workpiece side layer.

33. The protective workpiece cover of claim 32 in which the top layer has an upper surface formed of a slippery material in relation to fabric.

34. The protective workpiece cover of claim 32 in which the intermediate layer is formed of one or more materials selected from a group consisting of shock absorbing material, impact resistant material, chemical resistant material, dent resistant material and pierce resistant material.

35. The protective workpiece cover of claim 34 in which the top layer has an upper surface formed of a slippery material in relation to fabric.

36. The protective workpiece cover of claim 34 further comprising lateral extensions secured to at least one of the detachable layers.

37. The protective workpiece cover of claim 36 in which the lateral extension are detachable.

* * * * *

UNITED STATES PATENT AND TRADEMARK OFFICE
CERTIFICATE OF CORRECTION

PATENT NO. : 6,152,487
DATED : November 28, 2000
INVENTOR(S) : C.R. Crick

It is certified that error appears in the above-identified patent and that said Letters Patent is hereby corrected as shown below:

| COLUMN | LINE | |
|---|---|---|
| [56] Pg. 1, col. 1 | Refs. Cited (U.S. Pats.) | insert in appropriate numerical order the following: --5,799,975  9/1998  Crick-- |
| 6 (Claim 4, | 25 line 4) | "beneath." should read --beneath it.-- |
| 6 (Claim 8, | 34 line 2) | "mains" should read --means-- |
| 6 (Claim 15, | 60 line 2) | "elements" should read --element-- |
| 8 (Claim 37, | 48 line 2) | "extension" should read --extensions-- |

Signed and Sealed this

Eighth Day of May, 2001

Attest:

NICHOLAS P. GODICI

Attesting Officer

Acting Director of the United States Patent and Trademark Office